United States Patent [19]

Dent et al.

[11] 3,951,238

[45] Apr. 20, 1976

[54] LINEAR MOTION ARRESTING DEVICE

[75] Inventors: Robert K. Dent, Seattle; Douglas K. DuBuque, Lynnwood, both of Wash.

[73] Assignee: Tyee Aircarft, Inc., Everett, Wash.

[22] Filed: Dec. 16, 1974

[21] Appl. No.: 533,285

[52] U.S. Cl. .................................. 188/1 B; 16/82; 74/531; 188/67; 188/129
[51] Int. Cl.[2] ..................... F16D 63/00; F16F 7/08
[58] Field of Search .............. 188/67, 129, 136, 1 B; 16/49, 82; 74/531

[56] References Cited
UNITED STATES PATENTS

| | | | |
|---|---|---|---|
| 2,139,666 | 12/1938 | Bogart | 188/129 X |
| 3,165,936 | 1/1965 | Dougherty | 74/527 X |
| 3,796,288 | 3/1974 | Hollnagel | 188/129 |
| 3,866,724 | 2/1975 | Hollnagel | 188/1 B X |

FOREIGN PATENTS OR APPLICATIONS

| | | | |
|---|---|---|---|
| 598,485 | 6/1934 | Germany | 188/129 |
| 734,266 | 7/1932 | France | 188/129 |

Primary Examiner—George E. A. Halvosa

[57] ABSTRACT

A piston is mounted for relative sliding movement in the cylindrical bore of a sleeve. The piston comprises a plurality of piston parts, one, a driving piston part connected with a prime mover or a fixed support. A piston rod, supported by the piston at one end and by a sleeve guide at the other end, drives said driving piston part. The other and driven piston parts are connected with, and driven by said one piston part through a metallic ball, rollable in a groove formed in abutting piston part surfaces. This groove extends generally parallel to the piston axis, at an angle thereto, and with the opposite end groove portions thereof closest to the piston axis. When the piston parts move in given and opposite directions, the depth of the groove reduces and the ball functions to transmit motion from the driving piston part to the driven piston part. When the piston parts move in the other direction, the depth of the groove increases and no motion is transmitted. The driven piston parts are relatively initially resiliently urged against the cylindrical bore so they tend to hold such position and movement of the driving piston in one direction causes relative motion between the piston parts and the ball-receiving groove causing the ball to wedge and interconnect the driving and driven piston parts. Movement of the driving piston part in the other direction disconnects the driving and driven piston parts.

8 Claims, 11 Drawing Figures

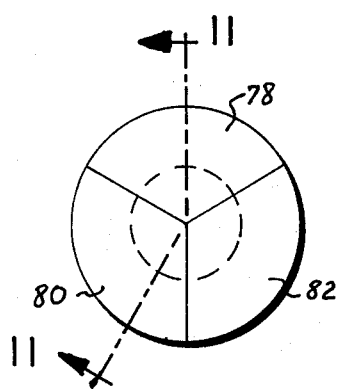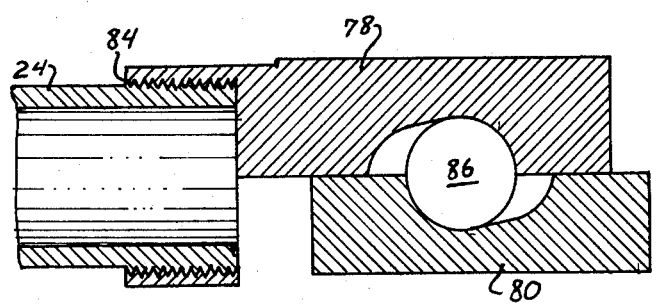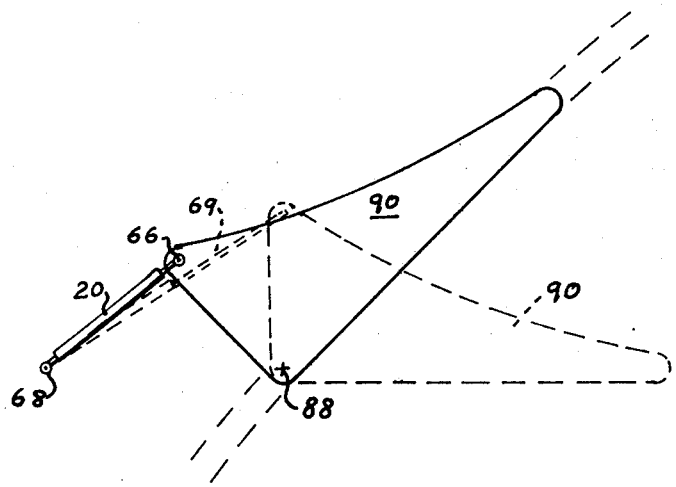
FIG. 10
FIG. 11
FIG. 9

LINEAR MOTION ARRESTING DEVICE

BACKGROUND OF THE INVENTION

One Field of Invention

Snubbers, or devices to arrest linear movement in one direction, have generally involved either hydraulic or pneumatic devices. These devices have included pistons and cylinders and variable pressure relief means. The hydraulic devices generally created leak problems in the packing glands and in the relief orifices. Pneumatic devices, not only have leak problems, but also their use was not practical where we had wide variations in temperature changes and moisture conditions. Also, pneumatic devices required considerable motion before any arresting action takes place, and, in general, were very bulky and thus their use was substantially limited.

The shortcomings of the hydraulic and pneumatic snubbers have resulted in the need of a mechanical snubber involving frictional contact between piston parts and a cylindrical bore controlling movement in one direction of travel and release of frictional contact between the parts during travel in the opposite direction.

SUMMARY OF THE INVENTION

A snubber or arresting device, having relative linear motion between a piston and sleeve, having a cylindrical bore therein, is the subject matter of this invention. The motion arresting device comprises a mechanical brake or friction device between the sleeve and the piston. The piston comprises a plurality of piston parts divided on planes parallel to the longitudinal axis of the piston. If the piston is moved and becomes the prime mover, then one of the piston parts becomes the driving piston part. The remaining piston parts are longitudinally slidable relative to the driving piston parts and are driven through a steel ball operating within a groove provided in the said piston parts.

The piston parts provide a piston having a diameter to slidingly mate the cylindrical bore in the sleeve. Preferably, the diameter at the ends of the piston is less than that of the central portion of the piston. The piston parts are slidable relative to each other and along planes parallel to the axis of the cylindrical bore. The piston parts are provided with a groove located in abutting surfaces of the piston parts, with one part of the groove in one piston part and another part of the groove in another piston part. This groove is formed generally parallel to the axis of the piston but at an angle thereto, with opposite end portions of the grooves closer to the axis of the piston than other portions of the grooves. Thus, when the piston parts relatively move in given and opposite directions, the depth of the complete groove between two piston parts reduces. When they relatively move in the other and opposite directions, the depth of said groove increases. When the depth of said groove reduces, the ball is wedged in such groove between piston parts and functions to transmit motion from the driving piston part to the other or driven piston part or parts. The driven piston part or parts are initially resiliently urged against the cylindrical bore so they or it tends to initially engage the cylindrical bore and movement of the driving piston part in a given direction will tend to cause relative motion between the piston parts. With relative movement of the piston parts and because of the angle of the groove in each respective piston part, the steel ball will become wedged between piston parts and the motion of the driving piston will be imparted to motion of the driven piston parts, separating and urging the piston parts outwardly into braking relation with the cylindrical bore. In view of the fact that the thrust against the steel ball will vary with different loading of the driving piston part, the amount of braking between the piston parts and the cylindrical bore will vary with the amount of thrust on the ball. However, the rate of travel of the complete piston will not increase directly with the increase of loading of the driving piston part and the rate of travel of the complete piston will not vary as widely as changes in the extent of loading of the driving piston part.

Movement of the driving piston part in one direction causes the snubbing or linear motion arresting action because of mechanical brake action, while motion in the reverse direction of the piston part causes a brake release. Such motion in the reverse direction causes the movable piston part to move relative to the driving piston part, which allows the steel ball to move to the bottom or deepest portion of the ball groove and thus releases the braking action of the piston parts against the cylindrical wall.

The cylindrical bore has walls which are surfaced with a friction reducing material, such as Teflon. With such a sliding and friction reducing surface, the piston parts can be wedged apart by a ball movable in a variable groove and the parts will not freeze regardless of load providing the inclines of the groove are within certain tolerances. Thus, the operable range of the incline of the groove from a plane parallel to the axis of the pistion will be in the operable range of 8° to 13° and within an optimum desired range of 10° to 12°.

The foregoing and other objects of our invention will become implicit and explicit as the description of our invention proceeds in connection with the accompanying specification and drawings.

BRIEF DESCRIPTION OF THE DRAWINGS

FIG. 9 is a somewhat schematic view illustrating a use of my device in connection with the snubbing or arresting motion of a cabinet door;

FIG. 10 is an end view of a piston formed of a plurality of parts, such as three, one of which is a driving piston part and the other two of which are driven piston parts; and FIG. 11 is a sectional view taken substantially on broken line 11—11 of FIG. 10.

DESCRIPTION OF A PREFERRED EMBODIMENT

Figure 1:
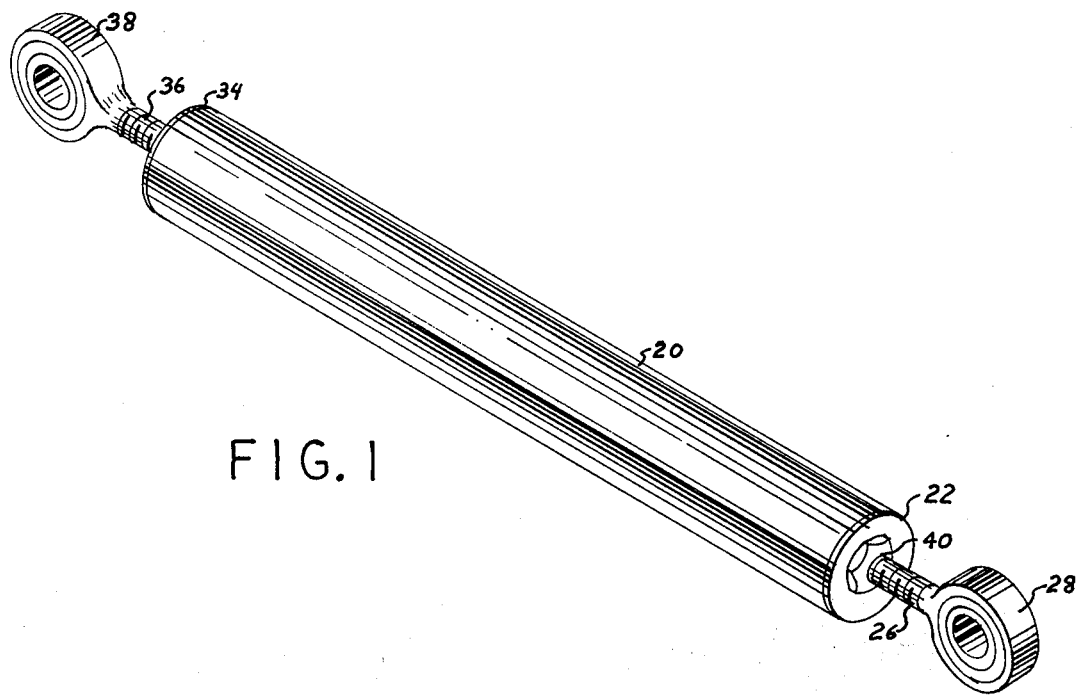
FIG. 1 is a perspective view of a snubber device embodying our invention.
Figure 2:
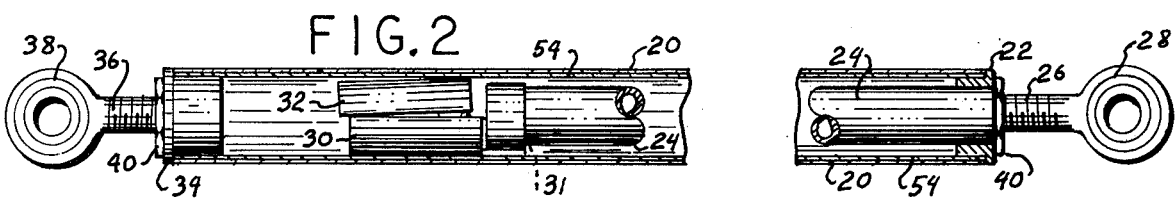
FIG. 2 is a longitudinal view of the structure of FIG. 1, with portions broken away to show parts of the invention within the sleeve.
Figure 3:
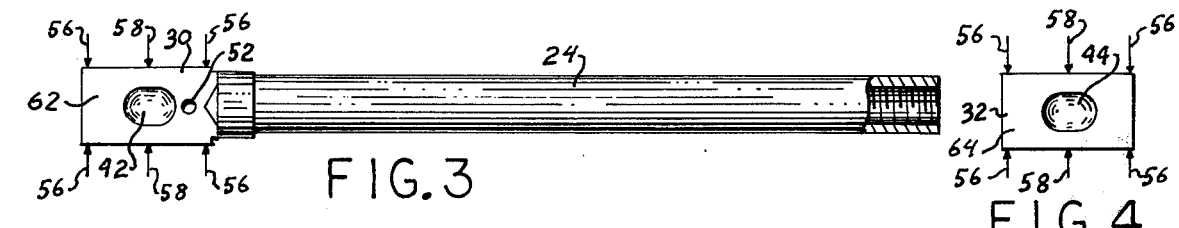
FIG. 3 is a detached elevational view, with parts in section, of the driving piston part and connecting rod connected thereto.

Referring to the figures, and particularly FIGS. 1 to 3, inclusive, a sleeve 20 is preferably of tubular form and is fabricated of any suitable material as, aluminum, steel, reinforced plastic, and the like. If the loading of the device is one of compression, then a piston sleeve guide 22 is slidingly coupled, or is a press fit, with sleeve 20. Piston rod 24 has one end portion thereof threaded to threadingly receive the shaft 26 of an attachment fitting, illustrated as a rod end bearing 28. The piston rod 24 has a free sliding fit with piston sleeve guide 22. Piston rod 24 has its other end portion secured to driving piston part 30. Driving piston part 30 is connected with piston rod 24 by any suitable means, as matching threads 31 carried by the piston rod 24 and the piston part 30. Thus, whether a push or pull is exerted on piston rod 24, the connection of it with the piston part 30 will be maintained.

In the form of the invention shown in FIGS. 1 to 8, the piston is composed of two parts, namely, a driving piston part 30 and a free or driven piston part 32. The two piston parts 30 and 32, together form a piston, circular in cross section, and which has a free sliding fit with the longitudinal bore of sleeve 20.

The other end of sleeve 20, when the parts are designed for use under compression, has a press fit with internally threaded end fitting 34. Threaded shaft 36 of the rod end bearing 38 is threadedly connected with the end fitting 34. To provide for overall desired length of the device between rod end bearings 38 and 28, lock nuts 40 are threaded on shafts 36 and 26 to maintain an adjusted length obtained by rotation of the rod end bearings 38 and 28.

Referring to FIGS. 3 to 6, inclusive, a groove 42 is located in the driving piston part 30 and a groove 44 is located in the driven or free piston part 32. The bottom of the groove 42 is at an incline to a horizontal axis parallel to the axis of the bore of the sleeve 20 and with the end portion closest to such axis to the right so far as the showing of FIGS. 5 and 6. Also, the bottom of the groove 44 is at an incline to a horizontal axis parallel to the axis of the bore of sleeve 20 and with the end portion closest to such axis to the left so far as the showing in FIGS. 5 and 6. Thus, when the driving piston part 30 relatively moves to the left, as respects the showing in FIG. 5 of the drawings, and moves relative to driven piston part 32 and to the position shown in FIG. 6 of the drawings, then the piston parts 30 and 32 move laterally away from each other as indicated by the space 46 in FIG. 6 of the drawings.

Figure 5:
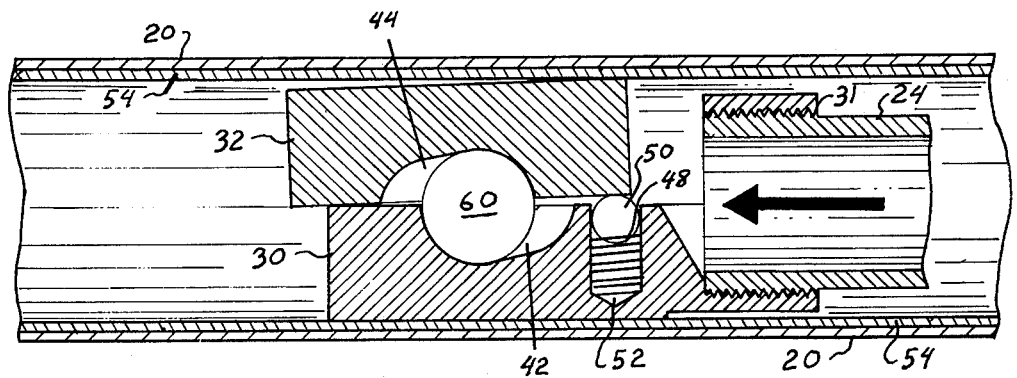
FIG. 5 is an enlarged, sectional, fragmentary view showing the sleeve, driven piston part, driving piston part, the metal ball between the two piston parts, and the spring loaded ball to provide initial friction between the driven piston part and the sleeve.
Figure 6:
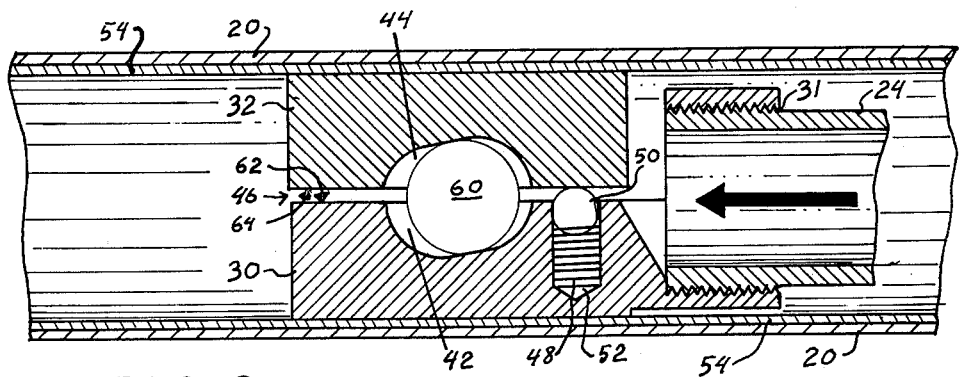
FIG. 6 is a view similar to FIG. 5 showing a position the parts will assume after the driving piston part moves relative to the driven piston part.
Figure 8:
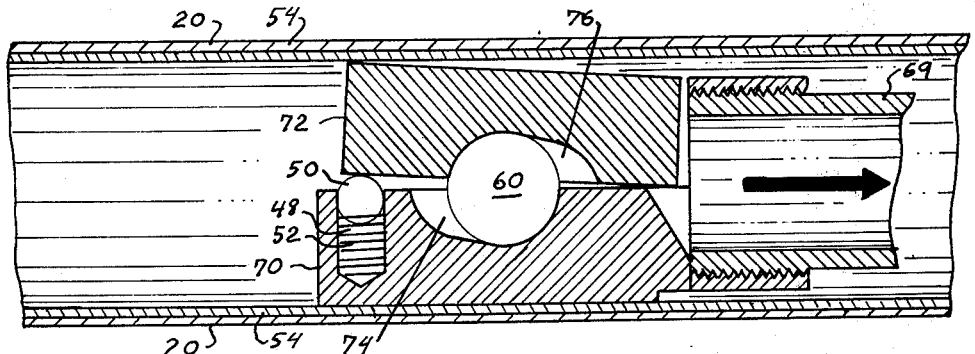
FIG. 8 is a view similar to FIG. 5 of the drawings, except that the various parts are parts shown in connection with FIG. 7 of the drawings, or, in other words, are under tension.

When the driving piston part 30 is moved toward the left, as respects the showing of FIG. 5, it is desired that there be some relative movement longitudinally between the piston parts 30 and 32 and hence, the provision of spring 48 to spring load steel ball 50. Steel ball 50 and spring 48 are contained by a recess 52, and located in driving piston 30. Said spring 48 provides for a pressure so that an end portion, preferably the trailing end portion of a driven or free piston part 32, always has a frictional drag on the bore of sleeve 20.

The internal bore of the sleeve 20 is lined with a friction reducing liner 54. This liner 54 comprises burnished Teflon providing an internal bore of the diameter precisely slidingly fitting with the diameter of the piston composed of two parts, namely, driving piston part 30 and driven piston part 32. One way this may be accomplished is by providing a piece of cloth woven from Teflon and Dacron fibers and with the weaving so arranged that many, as four, Teflon fibers appear on one surface to each Dacron fiber on said surface and on the other surface many, as four, Dacron fibers appear to each Teflon fiber. Then a thermoset resin is applied to the side of the cloth which predominates with Dacron fibers and such side is abutted to the inner bore of the sleeve 20. Thereafter, the cloth and the sleeve are urged together and heat applied so the thermoset adhesive binds the cloth as a permanent liner to the sleeve 20. Then the side of the cloth which is now the inner bore of sleeve 20 and which is predominately Teflon is burnished to provide an extremely low friction and precisely contacting surface with the piston formed by piston parts 30 and 32.

A manner of obtaining the burnished bore of the Teflon liner 54 of the sleeve 20 is to frictionally engage the Teflon surface provided, as indicated above, with a piston of suitable size and hardness and for a desired period, all of which is within the knowledge and skill of those versed in this art.

Figure 4:
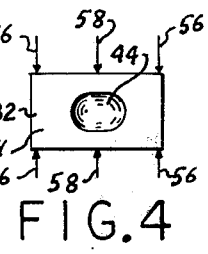
FIG. 4 is a detached elevational view of a driven piston part matching the driving piston part shown in FIG. 4 of the drawings.

The combined piston 30, 32 has reduced diameter at its end, as indicated by the arrows 56—56, over its diameter at its central portion, as indicated by the arrows 58—58, in FIGS. 3 and 4 of the drawings. The difference of the two dimensions is in the order of four or five one-thousandths of an inch. However, it has been found that the resulting shape, which may be generally termed beer-barreled, seems to result in a more nearer uniform speed of travel of the combined piston 30, 32 even though the amount of thrust on piston rod 24 varies substantially. Stating the results in another way, increased thrust on piston rod 24 and resulting increased thrust on combined piston 30, 32 does not result in a direct ratio increase in the rate of travel of such piston 30, 32.

When the parts are in the position shown in FIG. 5 of the drawings, the steel ball 60 contacts the portions of grooves 42 and 44 having the greatest depth or distances away from the longitudinal axis of the combined piston 30, 32. When steel ball 60 contacts such portions of the grooves, the inner surface 62 of the driving piston 30 and the inner surface 64 of the driven piston 32 are in contact, with a clearance of a thousandth or two of an inch at the trailing end portion of such piston (caused by the operation of spring loaded ball 50); the outer surface of the driving piston part 30 contacts the Teflon bore 54; and the end portion (shown to the right in FIG. 5) of the driven piston 32 contacts the Teflon bore or liner 54— the other end portion of the driven piston 32 (shown to the left in FIG. 5) having a small clearance in the order of a thousandth of an inch. Under such conditions, a thrust, applied to piston rod 24, causes steel ball 60 to roll on the surface of groove 42 in driving piston 30, driven piston 32 to remain stationary (because of its frictional contact with Teflon liner 54 to action of spring loaded steel ball 48, 50) and steel ball 60 to roll on the surface of groove 44 in driven piston 32. As the steel ball 60 rolls on the surfaces of said grooves, there is substantially no frictional contact therebetween.

The angle of the incline of the grooves 42 and 44 to the plane of the longitudinal axis of the bore of Teflon liner is in the operable range of 9° to 14° and optimum results obtain with angles in the range of 10° to 12°. In determining the exact angle to be used for said grooves, due consideration should be given to the nature and extent of the thrust load on piston rod 24 as well as the largest diameter of the combined piston 30, 32 as compared to the diameter of the bore of the Teflon liner 54.

As the thrust continues on piston rod 24, a point will be reached where the thrust to move the driven piston part 32 along with the driving piston part 30 overcomes the tendency of the steel ball and grooves 42 and 44 to separate the piston parts and the thrust on the driving piston part 40 will be braked by the action of both the piston parts 30 and 32 frictionally engaging the bore of the Teflon liner 54. At the end of the thrust travel cycle of piston rod 24, and if driving piston part 30 is moved in the opposite direction, the walls of grooves 42 and 44 in the piston parts 30 and 32 will roll on steel ball 60 and for only a minute delay (the delay of time for the ball to roll from its position shown in FIG. 6 of the drawings to its position shown in FIG. 5 of the drawings) the frictional engagement between the walls of the piston parts 30, 32 and the walls of the bore of the Teflon liner 54 ceases and the said piston parts 30, 32 slide in the bore of said Teflon liner 54 and without any substantial amount of friction due to the Teflon bearing between freely sliding parts.

In the previous figures, the greatest depth or distance of the groove 42 in the driving piston part 30 from the longitudinal axis of the combined piston 30, 32 was in the advance end portion of the groove (disposed in the direction of thrust) and the lesser depth or distance of such groove 42 from such axis was at the trailing end portion of such groove in the direction of travel of such thrust. The groove 44 in the driven piston part 32 was in the reverse direction, in that the greatest depth was in the trailing direction of travel of said thrust. Moreover, opposite end portions of said grooves 42 and 44 are similar in their depth from the longitudinal axis of the combined piston 30, 32. Also, in said figures, a thrust was indicated as a type of prime mover between the rod end bearings 28 and 38.

Figure 7:
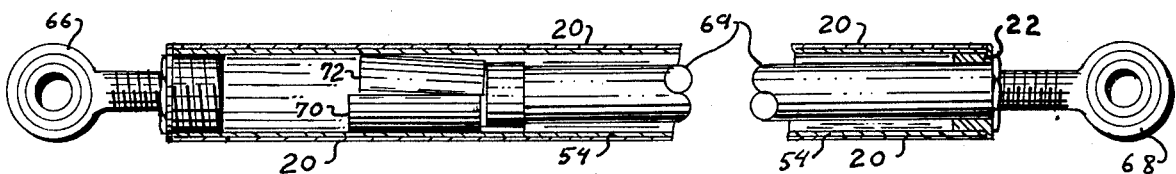
FIG. 7 is a view similar to FIG. 2 of the drawings, except that the parts in FIG. 2 of the drawings are shown as being under compression whereas, the parts are shown in FIG. 7 as being under tension.

However, a tension rather than a thrust may be the prime mover between two fittings, such as rod end bearings 66 and 68 illustrated in the construction of FIG. 7 of the drawings. As a tension force is applied rather than a thrust force, the rod end 66 is threadedly connected with the sleeve 20 whereas, such type of fitting may be used in connection with structure of the previous figures or a press type fitting may be used in such connection in such previous figures. Also, the rod end bearings 68 must be threadedly connected with a piston rod 69 which is otherwise a counterpart of the piston rod 24. The piston rod 69 is again threadedly connected with a piston part 70 and the piston part 70 will be the driving piston part and the counterpart of driving piston part 30. The driven piston part 72 will be the counterpart of the driven or free piston part 32. As will appear in FIG. 8 of the drawings, the groove 74 located in the driving piston part 70 will have its end portion of greatest depth (distance from longitudinal axis of combined piston 70, 72) at the end portion of the piston part 70 which is advancing, while the groove 76 in the driven piston part 72 will have its end portion of greatest depth at the trailing end portion. Again, opposite end portions of the grooves 74 and 76 will be similarly positioned.

In the structure illustrated in the previous figures, a combination piston having two parts as 30, 32 or 70, 72 was illustrated and described. However, a piston of a plurality of piston parts, one of which is the driven piston, is not limited merely to two parts. For example, in FIGS. 10 and 11, a combined piston comprising a plurality of parts, as a driving piston part 78, threadedly connected by threads 84 to a piston rod 24 and two driven piston parts 80 and 82 are shown. Also, the piston parts 78, 80, 82 are provided with grooves similar to those previously described to receive therein a steel metallic ball 86. The parts in this construction operate similarly to the parts shown in the previous figures and the structure may be designed so that the prime mover may be either a push or pull in accordance with the teachings of the previous figures.

An environment in which the present invention may be used, is in connection with passenger luggage bins on aircraft. In such example, a rotary motion to be snubbed or arrested is converted to a linear tension load. In FIG. 9, a bin 90 is mounted on fulcrum 88. A device of the present invention has a rod end bearing 68 pivotally connected with a suitable fixed support. The opposite rod end bearing 66 is pivotally connected with the bin 90 and at a location removed from the fulcrum 88. The bin 90 is in open position in the dotted line position shown and is in the closed position when in the full line position shown. The nature and mounting of the bin is such that any load in the bin acts to open the bin once the catch (not shown) is released. The said device 20, 66, 68 provides for snubbing or arresting the linear motion and the force obtaining, tending to open the bin, is a tension force to be snubbed or arrested.

SUMMARY

In the foregoing, a linear motion arresting or snubber device applying variable mechanical braking is illustrated and described. The motion to be so arrested may involve a tension or compression force. A sleeve 20 and a piston rod 24 or 69 are slidably mounted relative to each other and one thereof is connected to a fixed support. As an example thereof, the sleeve 20 is shown pivotally connected to a fixed support through a rod end bearing 38, or 68, and thus sleeve 20 illustrates a relatively stationary sleeve having a friction reducing, internal, cylindrical bore, as Teflon bore liner 54. A piston is slidably mounted in the bore or liner 54 and is formed of a plurality of pieces, illustrated as a driving piston part 30, 70 or 78, and a driven piston part 32 or 72 or 80 and 82. The piston parts are movable relative to each other and along planes parallel to the axis of the bore of the Teflon liner or bore 54. Also, the piston parts are movable toward and away from each other and said piston parts provide therebetween a ball receiving groove, as groove 42 in driving piston part 30 and groove 44 in driven piston part 32. Also, other ball receiving grooves are illustrated by grooves 74 and 76 in driving and driven piston parts 70 and 72 as well as the groove provided between the three piston parts 78, 80 and 82. The grooves involved extend generally parallel to the axis of the bore of Teflon bore liner 54 and the grooves extend at an angle to the longitudinal axis of the bore and opposite end portions of the groove extend more radially inward, for example, in FIGS. 5 and 6, the deeper part of the groove in piston part 32 is to the right whereas, the deeper portion of the groove in the piston part 30 is to the left. Similarly, in FIG. 8 and while the force direction is changed from a thrust to a tension force, the deeper portions of the grooves in the driven and driving piston parts are again on opposite end portions of the piston parts 70 and 72. A metallic ball 60 of FIGS. 5, 6, and 8, or a metallic ball 86 of FIGS. 10 and 11 in each instance is mounted for travel relative to the groove and the ball is movably mounted in the ball receiving groove. Resilient means, such as spring loaded ball 50, are employed to initially urge at least one of said piston parts into contact with the cylindrical bore of Teflon liner 54. A prime mover means, such as one providing a compression force or a tension force, is applied through a connecting rod as piston rod 24, piston rod 69, or the like, to move the driving piston part, as piston part 30, 70, or 78 and the driven piston part is moved by force transmitted through the steel ball from the driving piston part.

In one form of the invention, two piston parts are shown and each piston part is semicircular in contour. The friction reducing surface in the cylindrical bore in all instances is shown as a burnished Teflon liner.

A manner of securing the Teflon liner to the bore of sleeve 20 is illustrated by employing a Teflon-Dacron cloth where more Teflon fibers appear on one surface and more Dacron fibers appear on the other surface. The purpose of this is that Dacron can be readily secured to metal by the use of a thermoset resin whereas, not as satisfactory bond is obtained if it is attempted to so secure Teflon to a metal surface. After the cloth is so secured to the surface, the surface is burnished to provide the friction reducing, internal, cylindrical bore of the Teflon liner 54.

Preferably, the complete combination piston is somewhat barrel shaped or has its edge portions eased off and this seems to aid in causing the combined piston to start to travel and in turn this reduces the variation in travel of the combined piston and the said combined piston tends to travel at a uniform rate despite changes of loading of the force causing the piston to travel. For example, if the bin 90 of FIG. 9 carries a one-hundred pound load tending to open the bin, the time duration for complete opening has been timed at approximately three seconds and if the load on the door is reduced to a ten-pound load, the time duration is approximately five seconds.

Whether the force is a thrust force or a tension force applied to the driving piston, the ball groove in the driving piston will have its deeper groove portion toward the advancing end portion of said piston and its shallower portion toward the trailing end portion of said piston. Also, opposite end portions of the grooves will be mated.

To cut down wear and support a piston and piston rod throughout its length, preferably, a piston sleeve guide 22 is located to support the end portion of the piston rod away from the combination piston, such as the piston comprising piston parts 30 and 32.

Obviously, changes may be made in the forms, dimensions, and arrangements of the parts of this invention without departing from the principle thereof, the foregoing setting forth only preferred forms of embodiment of our invention.

We claim:

1. A linear motion arresting device comprising a relatively stationary sleeve having a friction reducing, internal, cylindrical bore; a piston slidingly mating said bore and formed of a plurality of piston parts, slidable relative to each other along a plane parallel to the axis of said cylindrical bore and movable radially toward and away from each other, said piston parts, each having an elongated groove, extending generally parallel to the axis of said cylindrical bore and providing therebetween and directly between piston parts, a ball-receiving channel extending generally parallel to the axis of the cylindrical bore in which a ball may travel and extending at an angle thereto with one end portion of each groove extending more radially inwardly of the direction of said cylindrical bore than the other end portion; a metallic ball means mounted for traveling movement in said ball-receiving channel; resilient means urging one of said piston parts radially and into contact with said cylindrical bore; and prime mover means connected with another of said piston parts and moving said other piston part longitudinally of the cylindrical bore and in turn, through said metallic ball, moving said one piston part relatively longitudinally and radially of said cylindrical bore.

2. The combination of claim 1, wherein during motion arresting action the portion of the ball-receiving groove which extends more radially inwardly and which is located in the other piston part is positioned in the trailing end portion of such piston part and the position of the ball-receiving groove in the one piston part which extends more radially inwardly is in the advancing end portion of such piston part.

3. The combination of claim 2, wherein said other piston part is the driving piston part and is driven by a thrust force, and the portion of the ball-receiving groove therein which is more radially inward is positioned at the trailing end portion thereof and at the end portion where such piston part is connected with a thrust force; and the said one piston part is a driven piston part and the portion of the ball-receiving groove therein which is more radially inward is positioned at the advancing end portion thereof.

4. The combination of claim 2, wherein said other piston part is the driving piston part and is driven by a tension force, and the position of the ball-receiving groove therein which is more radially inward is positioned at the trailing end portion thereof away from the end portion where such piston part is connected with a tension force; and the said one piston part is a driven piston part and the portion of the ball-receiving groove therein which is more radially inward is positioned at the advancing end portion thereof.

5. The combination of claim 2, wherein the portion of the ball-receiving groove which extends more radially inwardly and which is located in the driving piston part is positioned in the trailing end portion of such piston part, and tends, during motion arresting action to roll the metal ball toward the other end portion of the groove portion, such rolling of the metal ball exerting a radial outward thrust of the piston parts toward the stationary sleeve.

6. The combination of claim 1, wherein said other piston part carries a piston sleeve guide slidably mating the cylindrical bore.

7. The combination of claim 1, wherein one end portion of the relatively stationary sleeve has a coupling for connecting the same to a fixed support; the other piston part is connected to one end portion of a piston rod; a sleeve bearing is disposed between a mid portion of the piston rod and the other end portion of the relatively stationary sleeve; and the other end portion of the piston rod carries a coupling for connection with a prime mover.

8. The combination of claim 1 wherein said resilient means urging one of said piston parts radially and in contact with said cylindrical bore comprises a recess in one of said piston parts disposed normal to the axis of the cylindrical bore and piston parts, a compression spring disposed in said recess, and a metal ball contacting said spring and urged thereby against another piston part and urging said other piston part frictionally against said cylindrical bore.

* * * * *